(12) United States Patent
Aikawa et al.

(10) Patent No.: US 9,866,719 B1
(45) Date of Patent: Jan. 9, 2018

(54) IMAGE READING OPTICAL SYSTEM AND IMAGE READING APPARATUS

(71) Applicant: FUJI XEROX CO., LTD., Tokyo (JP)

(72) Inventors: Kiyofumi Aikawa, Kanagawa (JP); Masaki Hachisuga, Kanagawa (JP); Takashi Hiramatsu, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/374,157

(22) Filed: Dec. 9, 2016

(30) Foreign Application Priority Data

Jun. 27, 2016 (JP) ................................. 2016-126397

(51) Int. Cl.
*H04N 1/04* (2006.01)
*H04N 1/028* (2006.01)
*H04N 1/10* (2006.01)

(52) U.S. Cl.
CPC ....... *H04N 1/0289* (2013.01); *H04N 1/02825* (2013.01); *H04N 1/1061* (2013.01); *H04N 2201/0081* (2013.01)

(58) Field of Classification Search
CPC ............. H04N 1/0289; H04N 1/02825; H04N 1/1061; H04N 201/0081
USPC ........................................ 358/482, 475, 474
See application file for complete search history.

(56) References Cited

U.S. PATENT DOCUMENTS 4,398,787 A * 8/1983 Balasubramanian ............................ G02B 26/108 359/211.1
5,652,665 A * 7/1997 Chen ...................... G03B 27/54 250/228

FOREIGN PATENT DOCUMENTS

JP 2012-054910 A 3/2012

* cited by examiner

*Primary Examiner* — Houshang Safaipour
(74) *Attorney, Agent, or Firm* — Oliff PLC

(57) ABSTRACT

An image reading optical system includes an image reading unit including plural reading elements that are arranged in a first direction, a first reflective optical system configured to reflect reflection light which is irradiation light emitted from a light source and reflected on an object to be read, a second reflective optical system configured to condense the reflection light reflected on the first reflective optical system to the image reading unit, and an aperture stop including a plate shaped member formed with an aperture configured to regulate the reflection light reflected on the first reflective optical system in the first direction, the plate shaped member including at least one plate shaped piece bent at a preset angle with respect to the aperture along a tangent line of the aperture in the first direction.

7 Claims, 7 Drawing Sheets

IMAGE READING OPTICAL SYSTEM AND IMAGE READING APPARATUS

CROSS-REFERENCE TO RELATED APPLICATIONS

This application is based on and claims priority under 35 USC 119 from Japanese Patent Application No. 2016-126397 filed Jun. 27, 2016.

BACKGROUND

Technical Field

The present invention relates to an image reading optical system and an image reading apparatus.

SUMMARY

According to an aspect of the invention, an image reading optical system includes an image reading unit including plural reading elements that are arranged in a first direction, a first reflective optical system configured to reflect reflection light which is irradiation light emitted from a light source and reflected on an object to be read, a second reflective optical system configured to condense the reflection light reflected on the first reflective optical system to the image reading unit, and an aperture stop including a plate shaped member formed with an aperture configured to regulate the reflection light reflected on the first reflective optical system in the first direction, the plate shaped member including at least one plate shaped piece bent at a preset angle with respect to the aperture along a tangent line of the aperture in the first direction.

BRIEF DESCRIPTION OF THE DRAWINGS

Exemplary embodiments of the present invention will be described in detail based on the following figures, wherein.

DETAILED DESCRIPTION

Hereinafter, an exemplary embodiment of the present invention will be described with reference to the accompanying drawings.

Figure 1:
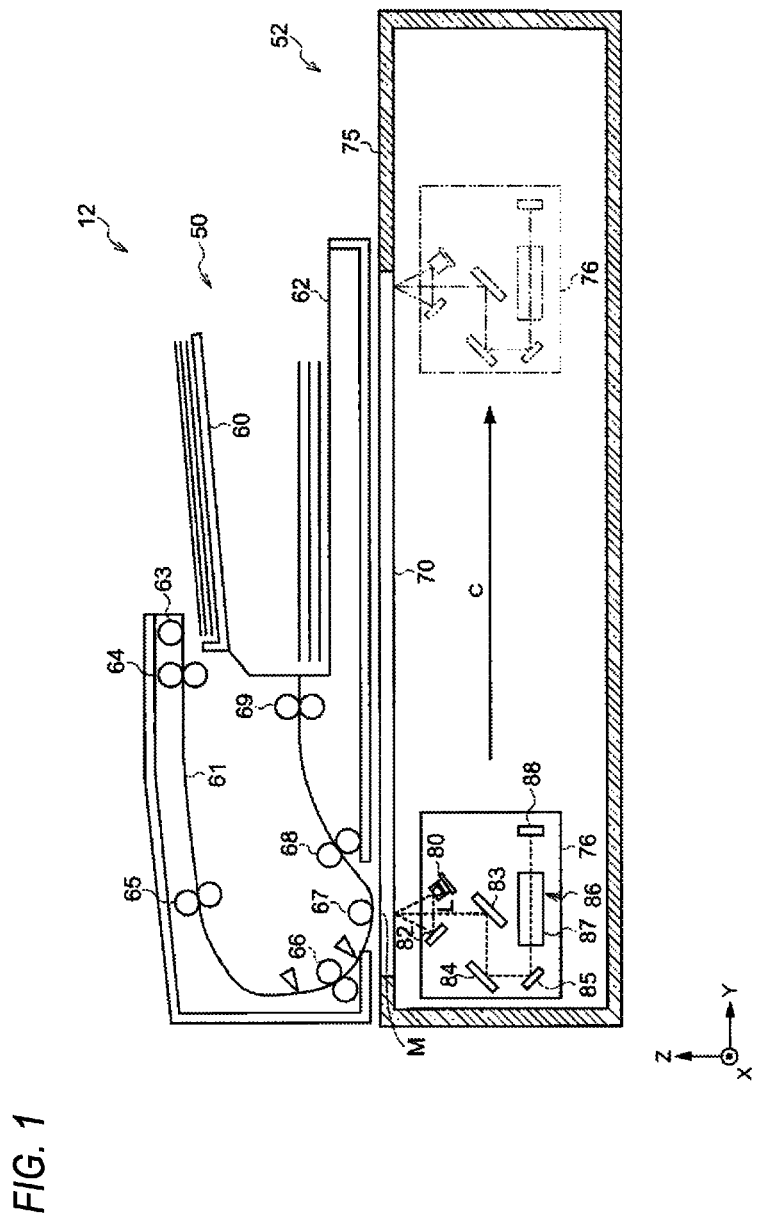
FIG. 1 is a schematic sectional view illustrating an exemplary configuration of an image reading apparatus according to an exemplary embodiment.

An image reading apparatus 12 according to an exemplary embodiment of the present invention will be described with reference to FIG. 1. FIG. 1 illustrates an outline configuration of the image reading apparatus 12. The image reading apparatus 12 is incidentally installed in, for example, an image forming apparatus and used to read a document or the like (an object to be read). As illustrated in FIG. 1, the image reading apparatus 12 includes an automatic document feeder 50 and an image reading processor 52 that reads an image formed on a surface of a document.

The automatic document feeder 50 according to the present exemplary embodiment includes a document loading stand 60 on which a document is loaded, a document transport path 61 that transports a document, and a discharge stand 62 to which a document is discharged after an image is read.

The document transport path 61 is formed in a U shape, and a sheet delivery roller 63, delivery rollers 64, pre-registration rollers 65, registration rollers 66, a platen roller 67, out rollers 68, and discharge rollers 69 are provided around the document transport path 61. The sheet delivery roller 63 moves down during the transport of a document to pick up the document placed on the document loading stand 60. The delivery rollers 64 supply the uppermost document among the documents sent from the sheet delivery roller 63 to the inside of the automatic document feeder. The pre-registration rollers 65 temporarily stop the document sent from the delivery rollers 64 and correct the skew of the document. The registration rollers 66 temporarily stop the document sent from the pre-registration rollers 65 and adjust a reading timing. The platen roller 67 causes the document passing the document transport path 61 to face a platen glass 70 to be described later. The out rollers 68 and the discharge rollers 69 discharge the read document to the discharge stand 62.

The image reading apparatus 12 has a function to skim the surface of the document sent by the automatic document feeder 50 from the document loading stand 60, and a function to read the surface of the document placed on the platen glass 70 as described later.

The platen glass 70 is provided on the surface of a housing 75 of the image reading processor 52 which faces the automatic document feeder 50. A document of which an image is to be read may be placed on the platen glass 70. The platen glass 70 serve as an aperture through which the document is irradiated with light when the automatic document feeder 50 reads the document being transported. Further, within the housing 75, a reading unit (carriage) 76 is provided that is movable in the transport direction (the Y axis direction of FIG. 1) of the document and reads an image by being stopped at a reading position M of the platen glass 70 or reads an image while scanning throughout the entire platen glass 70.

The reading unit 76 includes an illumination unit 80 (light source), an image formation unit 87, and a sensor 88 (image reader). The image reading optical system. 86 according to the present exemplary embodiment is configured including the image formation unit 87 and the sensor 88.

The illumination unit 80 is configured with, for example, plural white light emitting diodes (LEDs) which are arranged and serve as a light source. A diffusion/reflection member diffuses and reflects the light emitted from the illumination unit 80 toward the document surface. Mirrors 83, 84, and 85 are members that guide the reflection light L which is obtained from the document surface to the image reading optical system 86.

The image formation unit 87 has a function to shape the light flux of the reflection light L which is obtained from the document surface (optical image) into a shape suitable for the light reception in the sensor 88. The image formation unit 87 may include an image formation lens (not illustrated)

that optically reduces the optical image obtained from the document surface. Details of the image formation unit 87 will be described later.

The sensor 88 has a function to photoelectrically convert the optical image obtained from the image formation unit 87 to generate signals of a red (R) color, a green (G) color, and a blue (B) color (image signals). As for the sensor 88, for example, one-dimensional line sensors extending in the X axis direction and dedicated for the colors R, G, and B, respectively, are arranged in three rows in the Z axis direction. As an example, a charge coupled device (CCD) image sensor is used. In other words, the sensor 88 is configured such that image capturing elements (reading elements) are arranged in parallel with each other in the X axis direction.

Subsequently, in the image reading apparatus 12 according to the present exemplary embodiment, the sequence of reading an image will be described.

In the image reading apparatus 12, when the document placed on the platen glass 70 is to be read, a controller (not illustrated) causes the reading unit 76 to move in the scanning direction (the direction of the arrow C in FIG. 1). Further, the controller causes the illumination unit 80 of the reading unit 76 to emit light and the document surface is irradiated with the light. By this irradiation, the reflection light L from the document is guided to the image reading optical system 86 through the mirrors 83, 84, and 85. The light guided to the image reading optical system 86 forms an image on the light receiving surface of the sensor 88. The sensor 88 reads each of the colors R, G, and B by one line substantially at the same time. When the reading in the direction of the line is carried out by the scanning throughout the entire size of the document, the document is read for one page.

Meanwhile, in the image reading apparatus 12, when the document placed on the document loading stand 60 is read, the controller (not illustrated) causes the document placed on the document loading stand 60 to be transported to the reading position M of the platen glass 70 along the document transport path 61. In this case, the reading unit 76 is positioned in a state of being stopped at the position represented by the solid line in FIG. 1. The controller causes the illumination unit 80 to emit light and the document surface is irradiated with the light. Accordingly, the reflection light L from the document closely contacted with the platen glass 70 by the platen roller 67 is guided to the image reading optical system 86 through the mirrors 83, 84, and 85. The light guided to the image reading optical system 86 forms an image on the light receiving surface of the sensor 88. The sensor 88 reads each of the colors R, G, and B by one line substantially at the same time. Then, when the entire document is caused to pass the reading position M of the platen glass 70, the document is read for one page.

As the optical system in which the reflection light L as obtained from the document surface is shaped into a shape suitable for the light reception in the sensor 88, an image reading optical system in which plural reflective optical systems each having a power (strength to bend light) in a predetermined direction are combined with each other may be used. In the image reading optical system in which plural reflective optical systems are combined with each other, a turn-back optical path is necessarily generated. Meanwhile, in the image reading optical system, the aperture stop is used in order to adjust the light amount, adjust a modulated transfer function (MTF; a transfer function of an optical system), increase the focal depth and for other reasons. This aperture stop is required to regulate light in both the long length direction of the sensor (the direction in which the image capturing elements are arranged, that is, the X axis direction of FIG. 1), and the short length direction of the sensor (the direction perpendicular to the direction in which the image capturing elements are arranged in parallel with each other; the Z axis direction of FIG. 1). When two reflective optical systems are provided, the aperture stop is generally positioned between the two reflective optical systems. In addition, a reflective optical systems may be referred to as an "image formation mirror."

Figure 6:
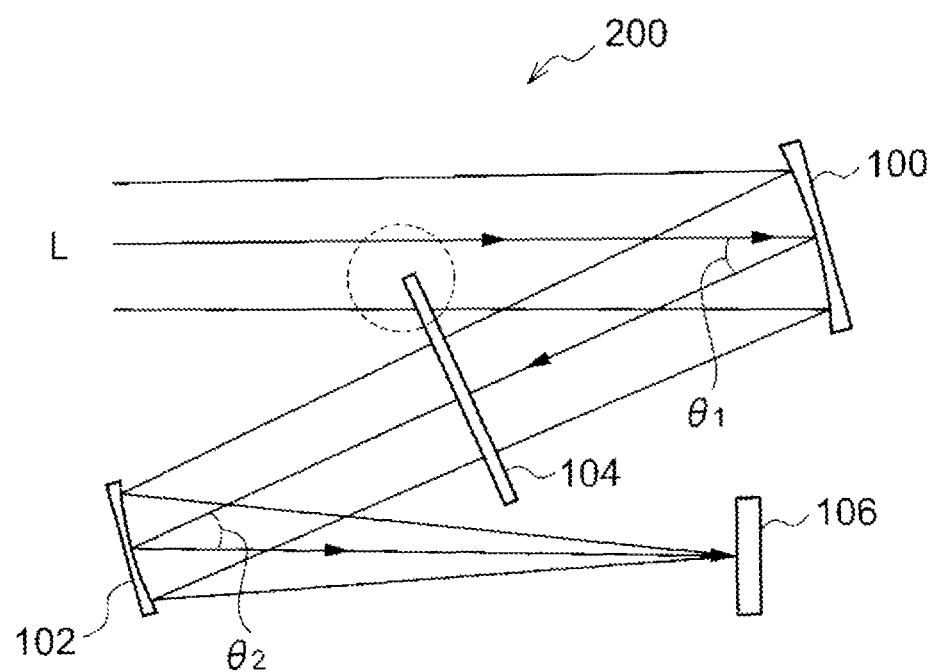
FIG. 6 is a schematic sectional view illustrating a configuration of an image reading optical system according to a comparative example.

FIG. 6 illustrates an image reading optical system 200 according to a comparative example as an example of the above-described image reading optical system. As illustrated in FIG. 6, the image reading optical system 200 includes an image formation mirror 100, an image formation mirror 102, an aperture stop 104, and a sensor 106.

Here, when it is intended to miniaturize the image reading optical system 200 by reducing the image reading optical system 200 especially in the short length direction or to improve the accuracy, that is, when it is intended to reduce the angle θ1 or θ2 in FIG. 6, the light incident on the image formation mirror 100, that is, the reflection light L obtained from the document surface may be blocked by the aperture stop 104 in the short length direction (see the dashed circle in FIG. 6). This is caused because the aperture stop 104 is generally manufactured by forming an aperture such as a circle in a plate shaped member, which requires a certain size both in the long length direction and in the short length direction.

Thus, in this exemplary embodiment, a plate shaped member having an aperture adapted to regulate the light flux in the long length direction is provided with a plate shaped piece bent at a predetermined angle at a tangent line position of the aperture in the long length direction. Further, suitably, the light flux is regulated in the short length direction by the plate shaped piece and an end portion (edge) thereof. Accordingly, since the angle of the plate shaped piece is set arbitrarily, the aperture stop in the short length direction is disposed so as not to interfere light upstream or downstream of the position of the plate shaped member, in a turn-back optical system such as the image reading optical system 200. Hence, the image reading optical system is reduced in the short length direction so that the bending angle of the optical path becomes small. In the descriptions herein, the terms "regulate the light flux in the long length direction" indicate regulating the light flux not to spread in the long length direction.

Figure 2:
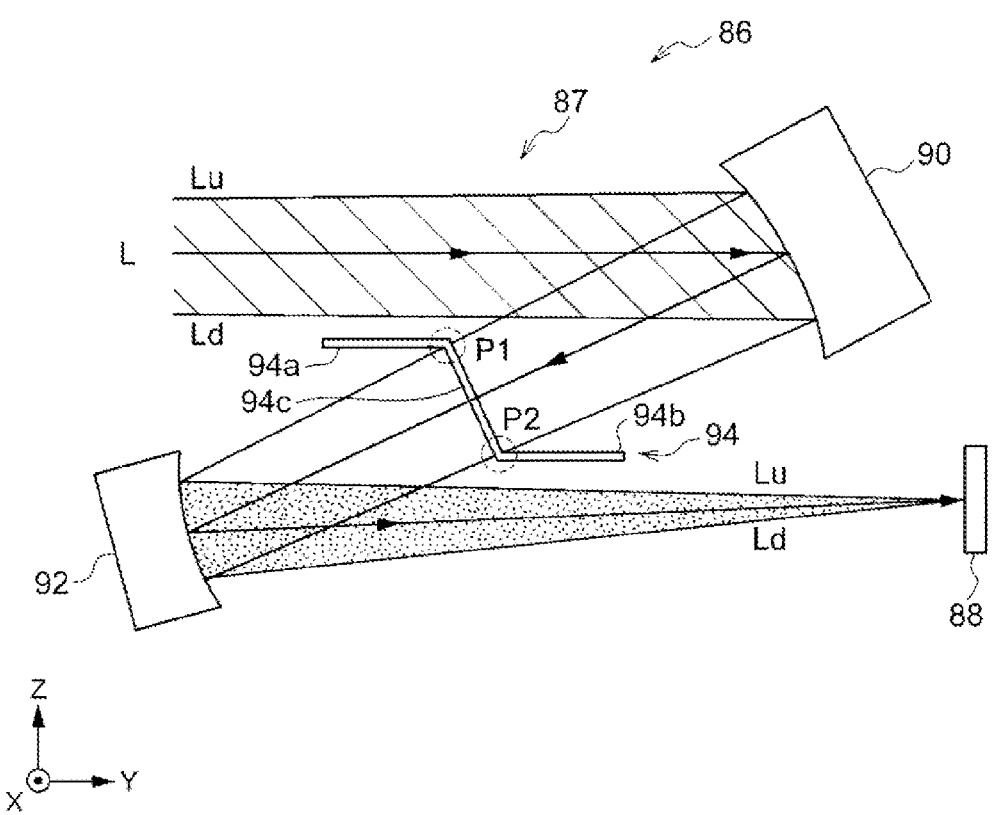
FIG. 2 is a schematic sectional view illustrating an exemplary configuration of an image reading optical system according to an exemplary embodiment.

The image reading optical system according to the exemplary embodiment of the present invention will be described with reference to FIGS. 2 to 4B. FIG. 2 illustrates a schematic sectional view of the image reading optical system according to the present exemplary embodiment. As illustrated in FIG. 2, the image reading optical system 86 includes the image formation unit 87 and the sensor 88. The image formation unit 87 includes an image formation mirror 90, an image formation mirror 92, and an aperture stop 94.

The image formation mirror 90 according to the present exemplary embodiment is a reflection mirror (a concave mirror in the present exemplary embodiment) that condenses the reflection light L obtained from the document surface, and reflects the light toward the image formation mirror 92. The image formation mirror 92 according to the present exemplary embodiment is a reflecting mirror (a concave mirror in the present exemplary embodiment) that reflects the light reflected by the image formation mirror 90 toward the sensor 88. The aperture stop 94 disposed between the image formation mirror 90 and the image formation mirror 92 regulates the light flux of the light L reflected by the image formation mirror 90 in the long length direction and the short length direction.

That is, the aperture stop 94 according to the present exemplary embodiment is provided with an aperture 96 to be described later and aperture stop pieces 94a and 94b (plate shaped pieces) so that the single aperture stop regulates the light flux of the reflection light L in both the long length direction and the short length direction. Hereinafter, the aperture stop regulating the light flux of the reflection light L in the long length direction may be referred to as a "first aperture stop," and the aperture stop regulating the light flux of the reflection light L in the short length direction may be referred to as a "second aperture stop." In addition, each of the light from the light source to the image formation mirror 90, the light from the image formation mirror 90 to the image formation mirror 92, and the light from the image formation mirror 92 to the sensor 88 may be referred to as "turning-back light."

Figure 3A:
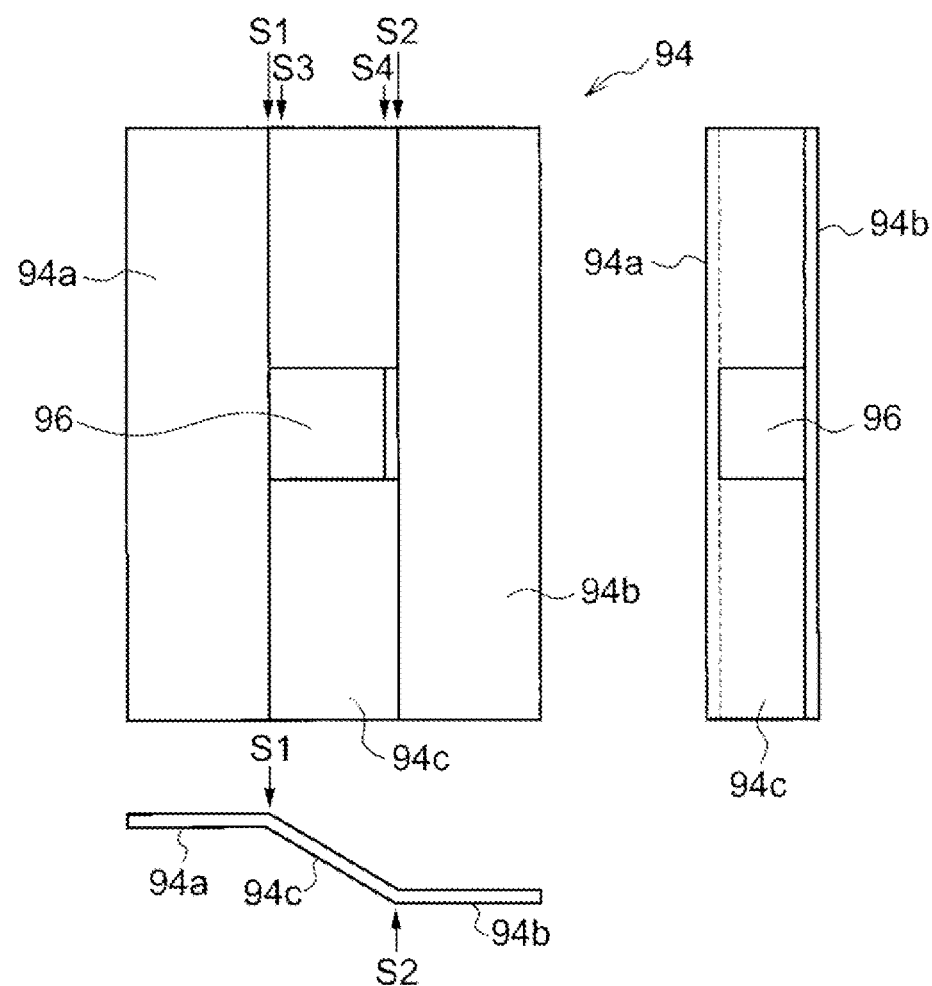
FIGS. 3A and 3B are views for explaining a shape of an aperture stop according to an exemplary embodiment.

The aperture stop 94 according to the present exemplary embodiment will be described in more detail with reference to FIGS. 3A and 3B. FIG. 3A includes three views of the aperture stop 94 when viewed in three directions. As illustrated in FIG. 3A, the aperture stop 94 includes an aperture stop plate 94c having the aperture 96 opened therein, and aperture stop pieces 94a and 94b formed to be bent in opposite directions with respect to bending lines S1 and S2 passing the end portions of the aperture 96.

Figure 3B:
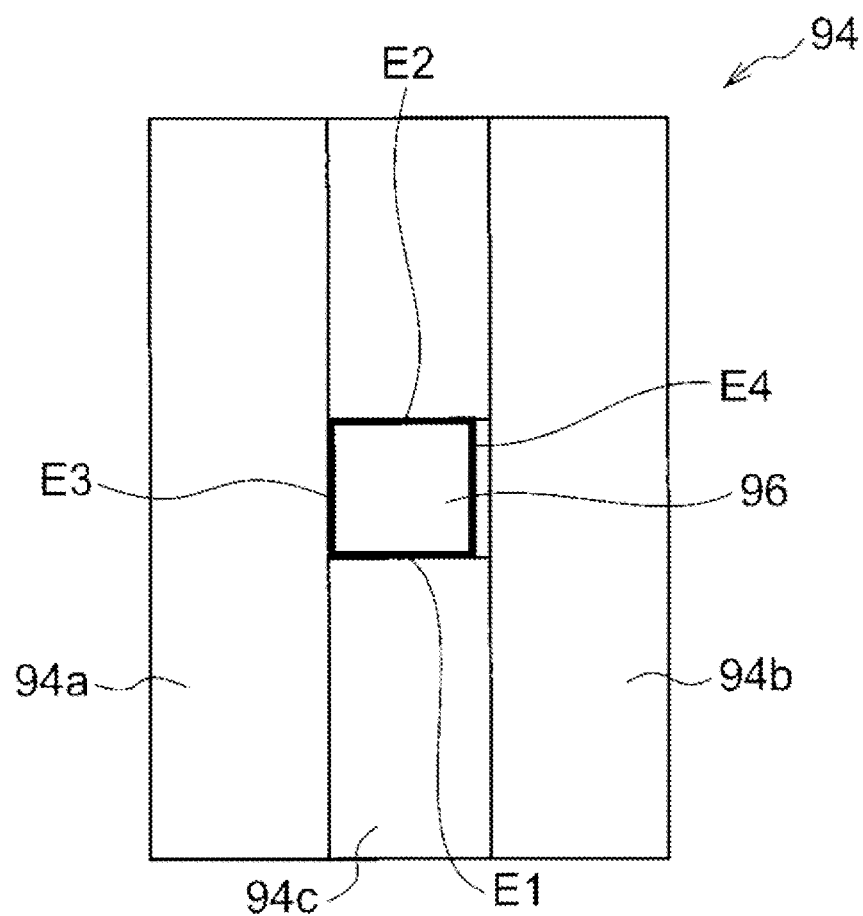

FIG. 3B is a view for explaining positions for regulating the light flux of the reflection light L in the long length direction and the short length direction, in the aperture stop 94 having the configuration of FIG. 3A. As illustrated in FIG. 3B, the light flux of the reflection light L in the long length direction is regulated by end portions E1 and E2 of the aperture 96, and the light flux of the reflection light L in the short length direction is regulated by end portions E3 and E4 of the aperture 96. That is, in the aperture stop 94 according to the present exemplary embodiment, the first aperture stop is formed by the end portions E1 and E2 of the aperture 96, and the second aperture stop is formed by the aperture stop piece 94a and the end portion E3 of the aperture stop piece 94a, and the aperture stop piece 94b and the end portion E4 of the aperture stop piece 94b.

Returning to FIG. 2, the regulation by the aperture stop 94 in the short length direction will be described in more detail. In FIG. 2, the uppermost light beam of the light flux of the reflection light L in the Z axis direction is represented as a light beam Lu, and the lowermost light beam thereof is represented as a light beam Ld. As illustrated in FIG. 2, in the image reading optical system 86 according to the present exemplary embodiment, the aperture stop piece 94a is disposed substantially in parallel with the light beam Ld of the light incident on and turning back from the image formation mirror 90, and the aperture stop piece 94b is disposed substantially in parallel with the light beam Lu of the turning-back light between the image formation mirror 92 and the sensor 88.

The aperture stop 94 disposed as described above regulates the light flux of the turning-back light between the image formation mirror 90 and the image formation mirror 92 in the long length direction by the end portions E1 and E2 illustrated in FIG. 3B, and regulates the light flux in the short length direction by the end portions E3 and E4. The regulation in the short length direction is carried out by regulating a predetermined range of light flux from the light beam Lu (hereinafter, "upper light flux") at a position P1 illustrated in FIG. 2, and regulating a predetermined range of light flux from the light beam Ld (hereinafter, "lower light flux") at a position P2 illustrated in FIG. 2.

Figure 4A:
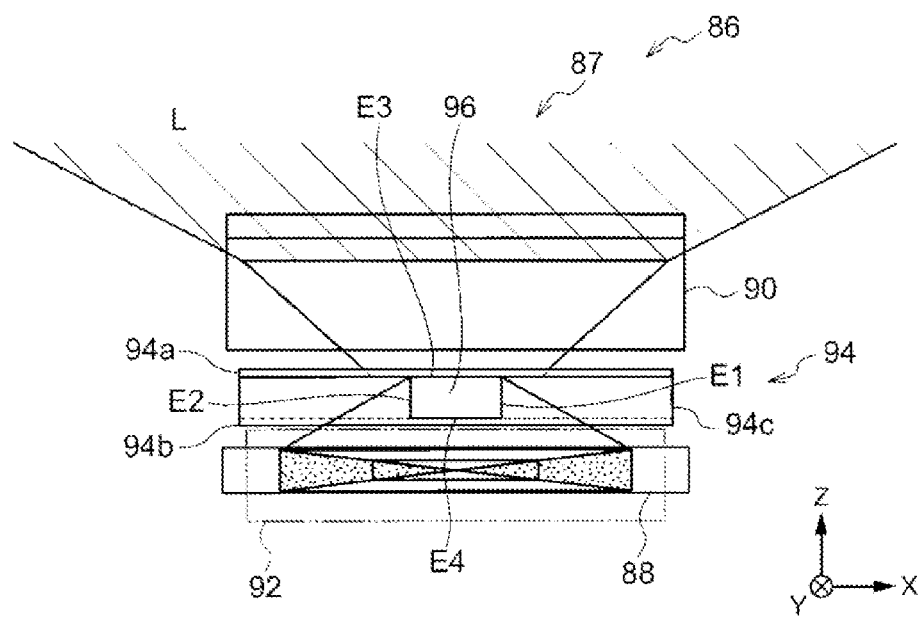
FIGS. 4A and 4B are a side view and a plan view each illustrating the exemplary configuration of the image reading optical system according to an exemplary embodiment.

The image reading optical system 86 will be described in more detail with reference to FIGS. 4A and 4B. FIG. 4A is a side view of the image reading optical system 86 illustrated in FIG. 2 when viewed in the +Y direction, and FIG. 4B is a plan view of the image reading optical system 86 illustrated in FIG. 2 when viewed in the -Z direction.

Figure 4B:
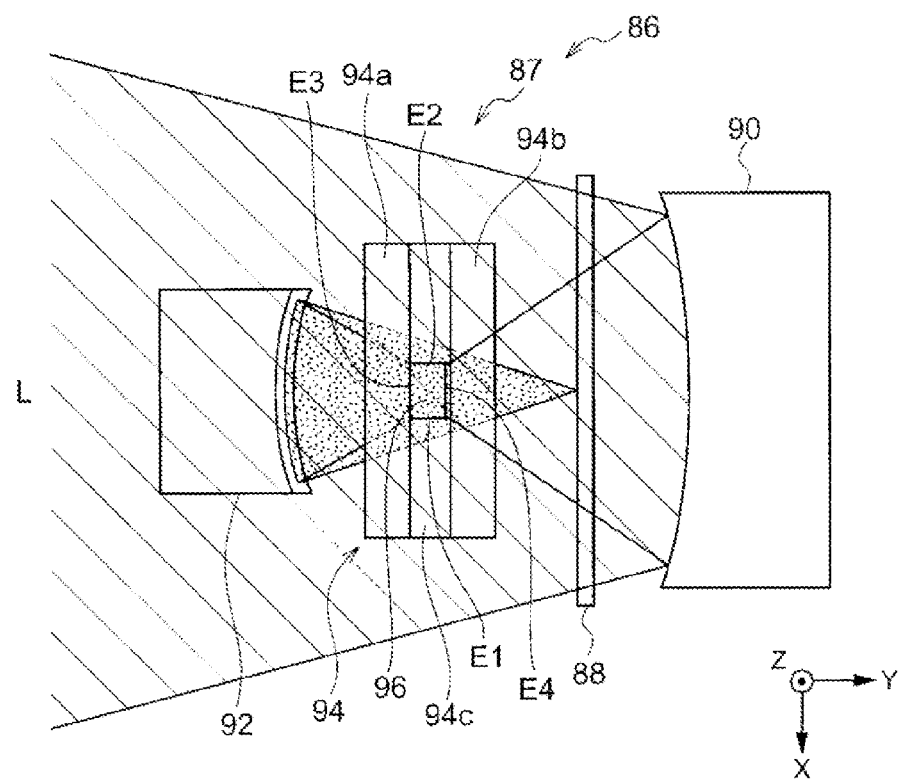

As illustrated in FIGS. 4A and 4B, the reflection light L is reflected on the image formation mirror 90, and the light flux of the reflected turning-back light is regulated in the long length direction (the X axis direction) by the end portions E1 and E2 in the aperture 96 of the aperture stop 94. That is, the first aperture stop is formed by the end portions E1 and E2. Meanwhile, the turning-back light reflected on the image formation mirror 90 is regulated in the short length direction (the Z axis direction) by the aperture stop piece 94a of the aperture stop 94 and the end portion E3 thereof, and the aperture stop piece 94b of the aperture stop 94 and the end portion E4 thereof. That is, the second aperture stop is formed by the end portions E3 and E4.

In the aperture stop 94 according to the present exemplary embodiment, the aperture stop piece 94a is disposed substantially in parallel with the light beam Ld, and the aperture stop piece 94b is disposed substantially in parallel with the light beam Lu. Hence, as illustrated in FIGS. 4A and 4B, the aperture stop piece 94a does not interfere the light flux of the turning-back light which is incident on the image formation mirror 90 (hereinafter, "upstream light flux"), and the aperture stop piece 94b does not interfere the light flux of the turning-back light between the image formation mirror 92 and the sensor 88 (hereinafter, "downstream light flux").

In other words, the end portions E3 and E4 of the aperture stop in the short length direction are formed as ends (edges) of the aperture stop pieces 94a and 94b disposed not to interfere the upstream light flux and the downstream light flux. In addition, the aperture stop piece 94a is disposed between the light flux between the image formation mirrors 90 and 92 (hereinafter, "regulation target light flux") and the upstream light flux, and the aperture stop piece 94b is disposed between the regulation target light flux and the downstream light flux. In this case, the aperture stop pieces 94a and 94b are disposed on different planes. Accordingly, the end portions E3 and E4 are disposed to be almost vertical to the regulation target light flux so that the focal depth becomes larger.

Since the aperture stop 94 having the above-described configuration is largely reduced in the short length direction, the image reading optical system 86 according to the present exemplary embodiment is further miniaturized in the short length direction, as compared to the image reading optical system 200 according to the comparative example.

Further, since the aperture stop piece 94a is configured as a plate shaped piece extending in the X axis direction, the aperture stop piece 94a suppresses stray light caused from the upstream light flux from being incident on the regulation target light flux. That is, the aperture stop piece 94a has a function of a blocking wall to block the stray light. Likewise, since the aperture stop piece 94b suppresses stray light caused from the downstream light flux from being incident on the regulation target light flux, the aperture stop piece 94b also has the function of the blocking wall to block the stray light.

In the present exemplary embodiment, the form of forming both the aperture stop pieces 94a and 94b of the aperture stop 94 has been described as an example. Without being limited thereto, however, the form of forming one of the aperture stop pieces 94a and 94b may be adopted depending on, for example, a state of the light flux to be regulated.

In the present exemplary embodiment, the form of forming the aperture stop pieces 94a and 94b by bending the plate shaped member along the bending lines S1 and S2 consistent with the end portions of the aperture 96 has been described as an example. Without being limited thereto, however, the aperture stop pieces 94a and 94b may be formed by bending the plate shaped member along bending lines positioned in further inner portions of the aperture 96, that is, the bending lines S3 and S4 illustrated in FIG. 3A.

Figure 5:
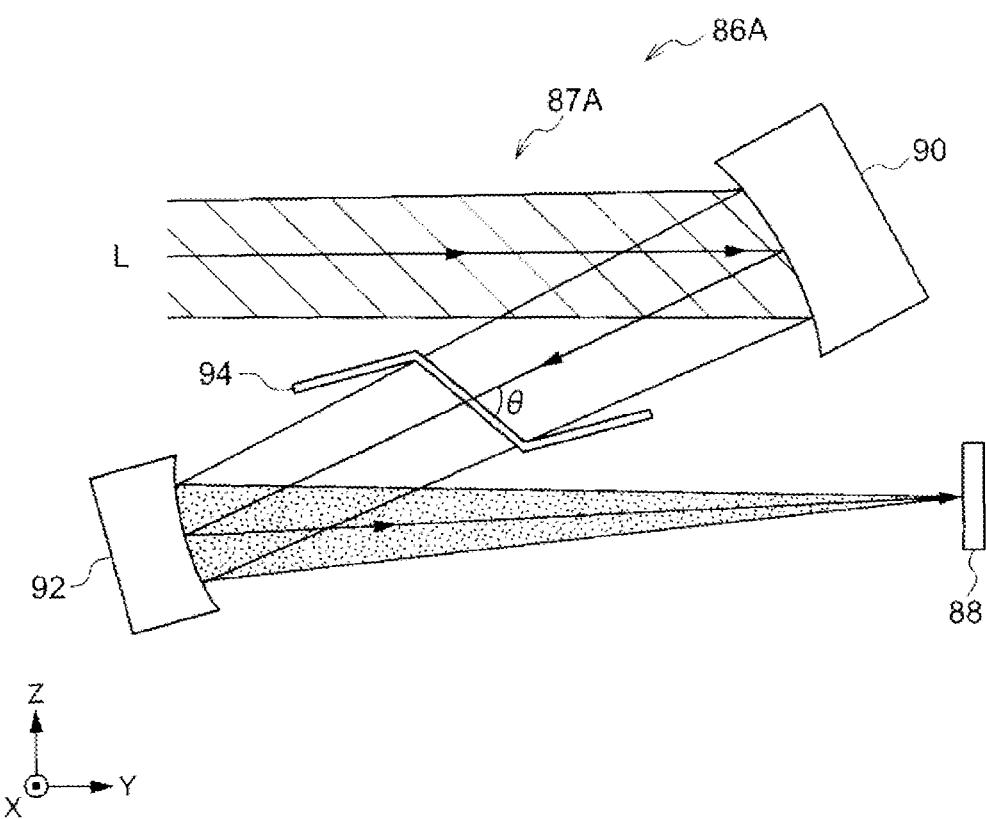
FIG. 5 is a schematic sectional view illustrating a modification example of the image reading optical system according to an exemplary embodiment.

In the present exemplary embodiment, as illustrated in FIG. 2, the form of disposing the aperture stop 94 to make the aperture stop plate 94c substantially vertical to the optical axis of the regulation target light flux has been described as an example. Without being limited thereto, however, the aperture stop 94 may be disposed to make the aperture stop plate 94c inclined with respect to the optical axis of the regulation target light flux. FIG. 5 represents an example of an image reading optical system 86A and an image formation unit 87A in which the aperture stop 94 illustrated in FIG. 2 is disposed to be inclined at an angle θ. In FIG. 5, since the aperture stop 94 is inclined, the aperture stop piece 94a is not in parallel with the upstream light flux, and the aperture stop piece 94b is not in parallel with the downstream light flux. However, in order to implement the parallel relationship, the angles of the aperture stop pieces 94a and 94b with respect to the aperture stop plate 94c may be changed.

In the present exemplary embodiment, the aperture stop 94 having the substantially rectangular aperture 96 has been described as an example. Without being limited thereto, however, the shape of the aperture may be a circle, an ellipse, a triangle or others in consideration of, for example, the sectional shape of the light flux to be regulated. In this case, the positions of the bending lines S1 and S2 may be positions of tangent lines with respect to the aperture in the long length direction (the X axis direction).

In the present exemplary embodiment, the form of using the image formation mirrors 90 and 92 (the concave mirrors in the present exemplary embodiment) each having a power in a predetermined direction as the reflection mirrors constituting the image reading optical system has been described as an example. Without being limited thereto however, for example, a plane mirror may be used. For example, when a plane mirror is disposed between the image formation mirrors 90 and 92, the optical path is turned back so that the length of the image reading optical system 86 in the Y axis direction is reduced, and the image reading optical system 86 is further miniaturized.

When the image formation mirrors 90 and 92 each having a power in a predetermined direction are used as the reflection mirrors constituting the image reading optical system, the direction of the power of each of the image formation mirrors 90 and 92 may be the long length direction or the short length direction. In addition, both of the image formation mirrors 90 and 92 may have the power, or only one thereof may have the power.

In the present exemplary embodiment, the form of using two image formation mirrors (the image formation mirrors 90 and 92) has been described as an example. Without being limited thereto, however, three or more image formation mirrors may be used. For example, one or more image formation mirrors may be additionally disposed between the mirror 85 and the image formation mirror 90 or between the image formation mirror 92 and the sensor 88 to cause the traveling light to be turned back.

Mirrors each having a positive power (a condensing optical system) are required before and behind the aperture stop, respectively, and a negative power (a magnifying optical system) may exist therebetween. It is obvious to a person understanding the existing aperture stop technology in the art that what is required is merely that an optical system or an optical system group having a total positive power is positioned in front of the aperture stop (the upstream side on the optical path), and an optical system or an optical system group having a total positive power is disposed behind the aperture stop (the downstream side on the optical path). Accordingly, in implementing exemplary embodiments of the present invention, the order of arrangement of the mirrors is arbitrary and whether the power of each of the plural mirrors is positive or negative is also arbitrary. It is easily understood by a person skilled in the art that the present invention may be smoothly implemented, for example, even when a mirror having a negative power exists immediately before the aperture stop.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading optical system comprising:
   an image reading unit including a plurality of reading elements that are arranged in a first direction;
   a first reflective optical system configured to reflect reflection light which is irradiation light emitted from a light source and reflected on an object to be read;
   a second reflective optical system configured to condense the reflection light reflected on the first reflective optical system to the image reading unit; and
   an aperture stop including a plate shaped member formed with an aperture configured to regulate the reflection light reflected on the first reflective optical system in the first direction, the plate shaped member including at least one plate shaped piece bent at a preset angle with respect to the aperture along a tangent line of the aperture in the first direction.

2. The image reading optical system according to claim 1, wherein the aperture stop regulates the reflection light reflected on the first reflective optical system in a second direction crossing the first direction by the plate shaped piece.

3. The image reading optical system according to claim 1, wherein the plate shaped piece meets one of:
   a first condition where the plate shaped piece is bent along a traveling direction of first turning-back light and disposed between the first reflective optical system and the second reflective optical system, the first turning-back light being incident on the first reflective optical system, and
   a second condition where the plate shaped piece is bent along a traveling direction of second turning-back light and disposed between the first reflective optical system and the second reflective optical system, the second turning-back light being reflected on the second reflective optical system.

4. The image reading optical system according to claim 3, wherein the plate shaped piece meets at least one of:
   a condition where the plate shaped piece meets the first condition and is bent in parallel with the traveling direction of the first turning-back light, and
   a condition where the plate shaped piece meets the second condition and is bent in parallel with the traveling direction of the second turning-back light.

5. The image reading optical system according to claim 3, wherein the image reading optical system is provided with both a first plate shaped piece meeting the first condition and a second plate shaped piece meeting the second condition.

6. The image reading optical system according to claim 5, wherein the first plate shaped piece and the second plate shaped piece are disposed on different planes.

7. An image reading apparatus comprising:
   a light source that emits light so that an object to be read is irradiated with the light; and
   the image reading optical system of claim 1.

\* \* \* \* \*